(12) United States Patent
O'Rourke

(10) Patent No.: US 6,722,317 B2
(45) Date of Patent: Apr. 20, 2004

(54) PORTABLE ANIMAL TREAT DISPENSING AND TRAINING DEVICE

(76) Inventor: Anthony L. O'Rourke, 23852 Pacific Coast Hwy., #201, Malibu, CA (US) 90265

(*) Notice: Subject to any disclaimer, the term of this patent is extended or adjusted under 35 U.S.C. 154(b) by 0 days.

(21) Appl. No.: 10/163,173

(22) Filed: Jun. 4, 2002

(65) Prior Publication Data

US 2003/0136345 A1 Jul. 24, 2003

Related U.S. Application Data

(63) Continuation-in-part of application No. 29/142,991, filed on Jun. 5, 2001.

(51) Int. Cl.[7] .............................................. A01K 29/00
(52) U.S. Cl. ..................... 119/707; 119/710; 119/51.01; 150/150
(58) Field of Search ................................ 119/707, 709, 119/710, 711, 712, 702, 51.01, 708; 150/150, 900

(56) References Cited

U.S. PATENT DOCUMENTS

| | | | | |
|---|---|---|---|---|
| 2,667,906 A | * | 2/1954 | Stiller | 150/150 |
| 2,823,723 A | * | 2/1958 | Cohn | 383/43 |
| 3,063,487 A | * | 11/1962 | Mullin | 150/150 |
| 3,119,429 A | * | 1/1964 | Stiller | 206/37.3 |
| 3,160,186 A | * | 12/1964 | Conley | 411/178 |
| 5,069,261 A | * | 12/1991 | Ji | 150/150 |
| 5,472,281 A | * | 12/1995 | Phelps | 383/43 |
| 5,623,980 A | * | 4/1997 | McMahon | 150/150 |
| 5,832,877 A | * | 11/1998 | Markham | 119/710 |
| 5,965,182 A | * | 10/1999 | Lindgren | 426/104 |
| 6,289,846 B1 | * | 9/2001 | Long | 119/51.03 |
| 6,361,210 B2 | * | 3/2002 | Denko | 383/35 |
| 6,427,634 B1 | * | 8/2002 | Mann | 119/709 |
| 6,470,830 B2 | * | 10/2002 | Mann | 119/709 |

* cited by examiner

*Primary Examiner*—Yvonne Abbott
(74) *Attorney, Agent, or Firm*—Holland & Knight LLP

(57) ABSTRACT

An animal treat dispensing and training device formed of a resilient material and defining a closed end and an elliptically shaped, slightly convex, dispensing end having an arcuate slot extending about the lower periphery thereof such that upon squeezing the dispenser adjacent its dispensing end, the slot is caused to open allowing one or more treats to be readily dispensed therefrom. Upon releasing the pressure on the dispenser, it returns to its prior disposition, closing and sealing the slot to again secure the remaining treats within the dispenser. A bell is attached to the device for attracting the attention of the animal to be trained whereby the user can shake the dispenser to alert the animal to a command and dispense the treat with the simple squeezing motion of the same hand to effect patterned response learning.

7 Claims, 2 Drawing Sheets

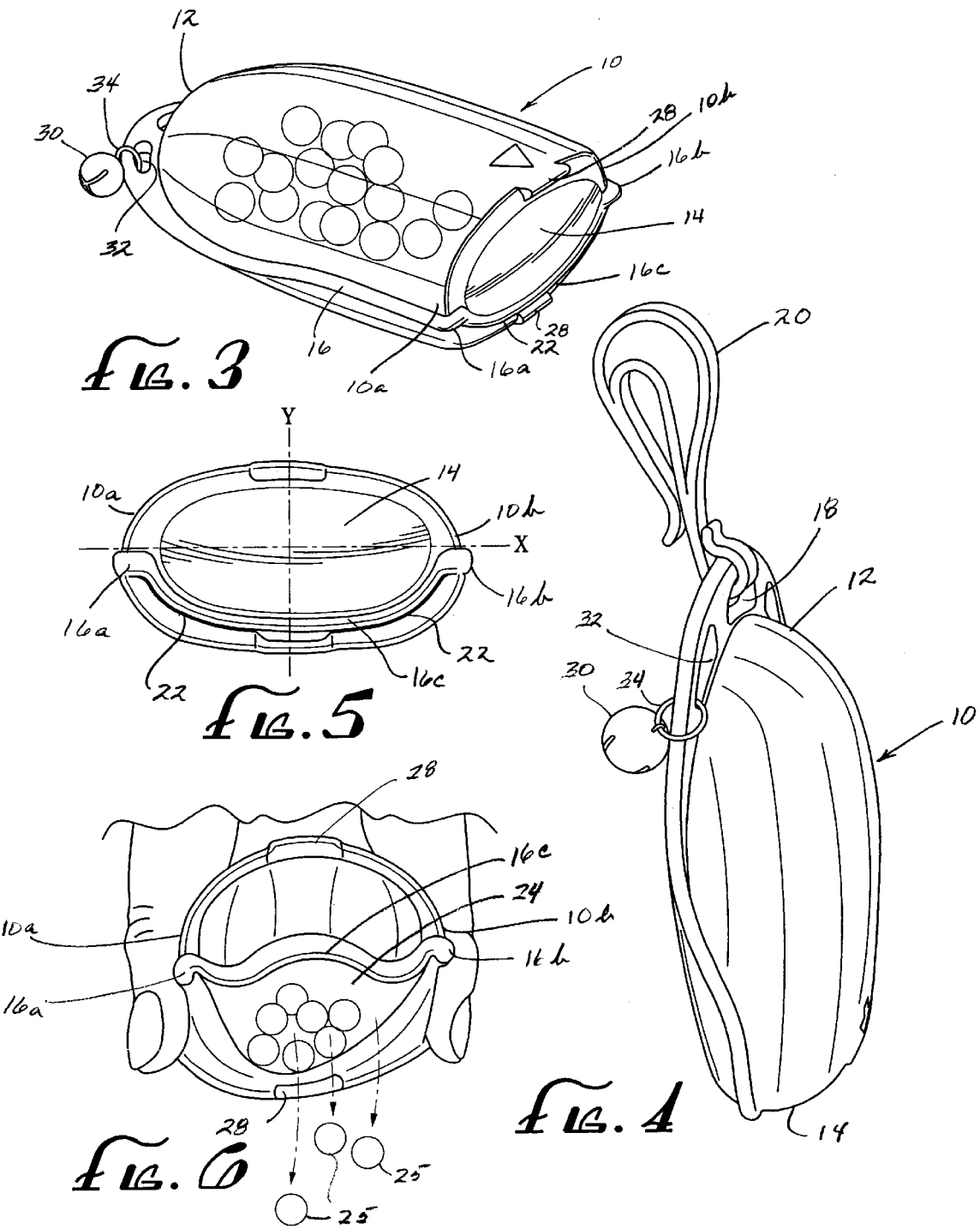

PORTABLE ANIMAL TREAT DISPENSING AND TRAINING DEVICE

This is a continuation-in-part of pending design patent application, Ser. No. 29/142,991, filed Jun. 5, 2001 and entitled Portable Animal Treat Dispenser.

BACKGROUND OF THE INVENTION

The present invention relates to a portable animal treat dispensing and training device. The importance of dog training, particularly in connection with animal recall, is well known. Dogs don't look both ways before crossing the street. Coming when called can save a dog's life. A popular method of recall training is based on a patterned response in which the dog's name is followed by a short easy to recall word that is used only for recall, e.g., "come". When the dog performs, it is praised and immediately rewarded with a treat (e.g. kibble). After numerous repetitions, the dog associates the word and the act of returning to caller with the treat and will return on command. Unfortunately, the human voice is relatively low in tone and does not register with dogs as well, particularly at long range, as a high pitch tone. It has been found that using a bell, for example, with a high pitch tone in combination with the treat reward system produces improved recall recognition and response.

A somewhat similar training method used to teach dogs a wide variety of commands and tricks comprises reciting the dogs name followed by the command word, e.g., sit, stay, etc. A noisemaker such as a cricket or whistle is then sounded to signal the release from the command which is again immediately followed by a treat. This method of training has proved to be highly successful as, with repetition, the dog quickly associates the command, his performance and release noise with the treat. However, the owner/trainer must always have on hand a supply of treats as well as the cricket, whistle or other noisemaker. The treats require a container or they will leave crumbs in one's pockets and crickets and whistles are often misplaced. The task of opening the container to extract the treat while holding onto the noisemaker and an excited animal and feeding the treat to the animal is generally awkward at best. It would therefore be desirable to provide a compact container that conveniently and efficiently carries and dispenses animal treats and is provided with an easily activated high-toned noisemaker to provide both an improved treat dispenser and animal training device.

The present invention comprises a novel configuration of treat dispenser in which the owner/trainer can, in one hand, conveniently carry the treats, easily open the device to dispense a treat, close and re-seal the device and, through the attachment of a high-toned bell, effectively use the dispenser itself as the noisemaker, thereby providing a very compact and efficient animal treat dispenser and training device. Such a device is ideally suited for use as a recall training device in that it can be used to provide a predetermined number of relatively high-pitched rings of the bell in lieu of calling the dog's name and the "come" command to effect recall. As a result of the ring or rings of the bell and its association with the dispensing of the treat, recall learning and performance is enhanced. Thereafter, the range of the high pitch tone provides an excellent recall device that is not offensive to humans.

SUMMARY OF THE INVENTION

Briefly, the invention comprises an elongated animal treat dispensing device adapted to carry a supply of kibble or other type dog treats that is formed of a resilient plastic material and defines a closed end and an elliptically-shaped, slightly convex, dispensing end having an arcuate slot extending about the lower periphery thereof such that upon squeezing the dispenser adjacent its dispensing end, the slot is caused to open, allowing one or more treats to be readily dispensed therefrom. Upon releasing the pressure on the dispenser, it returns to its prior disposition, closing the slot to seal the remaining treats within the dispenser. A bell having a relatively high pitch tone is carried by the dispenser whereby the user can simply shake the dispenser to alert the dog to the command and dispense the treat with a simple squeezing motion of the same hand.

It is the principle object of the present invention to provide a portable animal treat dispensing device having an attached high tone bell to form a compact, fully self-contained, highly efficient and simple to use animal training device.

It is another object of the present invention to provide a portable animal treat dispensing device that carries a supply of treats therein and is easily operable with a single hand to open the device to dispense one or more treats and then close the device, re-sealing the remaining treats therein.

It is yet another object of the present invention to provide a portable animal treat dispensing device having an audible device attached thereto that allows the user to both activate the audible device and dispense animal treats with a single hand.

It is another object of the present invention to provide an animal treat dispenser and training device that is effective for animal recall at long distances.

It is a further object of the present invention to provide a portable animal treat dispensing and training device that is readily carried by the user on a waistband.

It is yet another object of the present invention to provide an improved portable animal training device that is of simple construction and economical to manufacture.

These and other objects and advantages of the present invention will become readily apparent from the following detailed description taken in conjunction with the accompanying drawings.

BRIEF DESCRIPTION OF THE DRAWINGS

FIG. 3 is a perspective view of the present invention in the closed sealed position, showing the dog treats therein.

FIG. 4 is a perspective view of the present invention illustrating the high tone training and recall bell and the waistband attachment clip.

FIG. 5 is a perspective view of the portable animal treat dispenser of the present invention illustrating the squeezing action on the device to effect dispensing of treats.

FIG. 6 is a perspective view illustrating the use of the present invention in dispensing animal treats.

DETAILED DESCRIPTION OF THE PRESENT INVENTION

Figure 1:
FIG. 1 is a perspective view of the portable animal treat dispensing and training device of the present invention being carried by the user about her waistband.
Figure 2:
FIG. 2 is a perspective view of the present invention being used to dispense treats.

Referring now in detail to the drawings, the portable animal treat dispenser 10 of the present invention is preferably rotationally molded of a resilient plastic material such as polyvinyl chloride, is of a slightly elongated configuration, substantially elliptical in cross-section and defines a closed end 12, an elliptically and slightly convexly shaped dispensing end 14, and a perimeter rib or flange 16 that extends about the sides and closed end of the dispenser 10 and defines a first aperture 18 therein at the closed end 12 adapted to receive a waistband securement clip 20. The dispensing end 14 of dispenser 10 defines a major axis X, a minor axis Y and an arcuate slot 22 extending about the lower perimeter of end 14 between the two ends 16a and 16b of rib 16. Thus, the length of arcuate slot 22 is greater than the major diameter of end 14 along axis X. Accordingly, upon squeezing the dispenser 10 adjacent dispensing end 14 along major axis X, the two opposed sides 10a and 10b are pressed toward each other as seen in FIG. 5, causing the slot 22 to form a large centrally disposed opening 24 through which the the pressure on the opposed sides of the dispenser, the resiliency and memory in the plastic material will cause the dispenser to return to its previously unstressed state, closing and sealing opening 24 and securing the remaining treats 25 within the dispenser 10. Thus, through the aforesaid configuration, a wide dispensing opening is provided at the center of the dispensing end of the dispenser 10 which avoids the obstruction of treats 25 along the side walls and allows for a smooth controlled release of the treats.

In the preferred embodiment of the dispenser 10, a portion 16(c) of the rib 16 extends across the lower portion of dispensing end 14 in an arcuate configuration adjacent the upper side of slot 22 to provide the central opening 24 with its desired configuration. A pair of feet 28 can be positioned across the Y axis of dispensing end 14 that cooperate with rib ends 16a and 16b to provide a vertical support surface for the dispenser. The securement clip 20 allows the device to be secured to and carried by the user's waistband as seen in FIG. 1.

A noisemaker, preferably a round metal sleigh bell 30 having a high pitch tone is secured to the dispenser 10. A second aperture 32 is provided in rib 16 proximate closed end 12 for the attachment of the bell by means of a metal "jump ring" 34. Other forms of attachment could, of course, also be employed. To enhance the effectiveness of the dispenser as an animal training device and the audible range of the device, and to minimize any annoyance to humans, sleigh bell 30 is preferably selected so as to have a tone, as measured on a standard piano tonal scale, from C above Middle C, to F, five octaves above Middle C.

In use, the dispenser 10 is shaken a predetermined number of times to effect a corresponding number of bell rings. When the animal, most commonly a dog, responds to the selected number of rings and comes to the trainer, the dispenser is squeezed in full view of the dog to present the treat to the dog whereupon the dog will quickly come to associate the sound generated by the dispenser with the treats held therein, facilitating the recall training. Similarly, in learning other tricks, the sound of the bell is quickly associated with the reward and thus with the command, again enhancing the learning process. Once the association is learned the dispensing and training device will provide an excellent response and recall device that is simple and convenient to use, effective at relatively long ranges and is not annoying to other humans.

Various changes and modification can be made in carrying out the present invention without departing from the spirit and scope thereof. Insofar as these changes and modifications are within the purview of the appended claims, they are to be considered as part of the present invention.

I claim:

1. A portable animal treat dispensing device comprising a treat container formed of a resilient material and defining a closed end and an opposed dispensing end, said dispensing end being of a generally elliptical and slightly convex configuration and defining a major axis extending transversely across said end, a minor axis perpendicular thereto and an arcuate perimeter slot extending along a curvilinear oath and about a lower portion of said dispensing end, the length of said arcuate slot being greater than the transverse dimension of said dispensing end along said major axis, such that upon squeezing said dispenser proximate said dispensing end along said major axis, said slot is caused to open along a central portion of said major axis for the dispensing of treats therethrough and upon cessation of the squeezing, said slot is caused to close by said resilient material to prevent the passage of treats therethrough.

2. The dispensing device of claim 1 including a noisemaker attached to and carried by said treat dispensing device whereby said device cooperates with said noisemaker to define an animal training device.

3. The animal treat dispensing device of claim 2 wherein said noisemaker is a bell.

4. A portable animal treat dispensing device comprising a treat container formed of a resilient material and defining a closed end and an opposed dispensing end, said dispensing end being of a generally elliptical and slightly convex configuration and defining a major axis, a minor axis and an arcuate perimeter slot extending about a lower portion of said dispensing end such that upon squeezing said dispenser proximate said dispensing end along said major axis, said slot is caused to open along a central portion of said major axis for the dispensing of treats therethrough and upon cessation of the squeezing, said slot is caused to close to prevent the passage of treats therethrough and including a rib projecting from said closed end thereof, said rib defining an aperture therein and including a securement clip extending through said aperture for securing said dispensing device to one's clothing.

5. A portable animal treat dispensing device comprising a treat container formed of a resilient material and defining a closed end and an opposed dispensing end, said dispensing end being of a generally elliptical and slightly convex configuration and defining a major axis, a minor axis and an arcuate perimeter slot extending about a lower portion of said dispensing end such that upon squeezing said dispenser proximate said dispensing end along said major axis, said slot is caused to open along a central portion of said major axis for the dispensing of treats therethrough and upon cessation of the squeezing, said slot is caused to close to prevent the passage of treats therethrough and including a bell attached to and carried by said treat dispensing device whereby said device cooperates with said bell to define an animal training device and wherein said bell, when rung, sounds a tone within the range as measured on a standard piano tonal scale of from C above Middle C, to F, five octaves above Middle C.

6. An animal training device comprising a treat container formed of a resilient material and defining a closed end and an opposed dispensing end, said dispensing end being of a generally elliptical and slightly convex configuration and defining a major axis extending transversely across said end, a minor axis perpendicular thereto and an arcuate perimeter slot extending along a curvilinear oath and about a lower portion of said dispensing ends the length of said arcuate slot being greater than the transverse dimension of said dispensing end along said major axis, such that upon squeezing said dispenser proximate said dispensing end along said major axis, said slot is caused to open along a central portion of said major axis for the dispensing of treats therethrough and upon cessation of the squeezing, said slot is caused to close by said resilient material to prevent the passage of treats therethrough, and a bell secured to and carried by said container whereby upon shaking said device to ring said bell a predetermined number of times and subsequently dispensing one or more treats from said device a patterned response form of animal training is provided.

7. An animal training device comprising a treat container formed of a resilient material and defining a closed end and an opposed dispensing end, said dispensing end being of a generally elliptical and slightly convex configuration and defining a major axis, a minor axis and an arcuate perimeter slot extending about a lower portion of said dispensing end such that upon squeezing said dispenser proximate said dispensing end along said major axis, said slot is caused to open along a central portion of said major axis for the dispensing of treats therethrough and upon cessation of the squeezing, said slot is caused to close to prevent the passage of treats therethrough, and a bell secured to and carried by said container, said bell, when rung, sounds a tone within the range as measured on a standard piano tonal scale of from C above Middle C, to F, five octaves above Middle C whereby upon shaking said device to ring said bell a produced number of times and subsequently dispensing one or more treats from said device, a patented response form of animal training is provided.

* * * * *

UNITED STATES PATENT AND TRADEMARK OFFICE
CERTIFICATE OF CORRECTION

PATENT NO. : 6,722,317 B2  
DATED : April 20, 2004  
INVENTOR(S) : Anthony R. O'Rourke It is certified that error appears in the above-identified patent and that said Letters Patent is hereby corrected as shown below:

Title page,
Item [75], change the inventor's middle initial from "L" to -- R --

Column 3,
Line 17, after "which the" insert -- animal treats 25 carried within the hollow dispenser 10 can be readily dispensed. Upon releasing --

Column 4,
Lines 9 and 63, change "oath" to -- path --
Line 64, change "ends" to -- end, --

Signed and Sealed this

Thirteenth Day of July, 2004

JON W. DUDAS
*Acting Director of the United States Patent and Trademark Office*